(12) United States Patent
Onoe

(10) Patent No.: US 7,855,941 B2
(45) Date of Patent: Dec. 21, 2010

(54) OPTICAL DISK DEVICE

(75) Inventor: Shinsuke Onoe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 12/151,677

(22) Filed: May 7, 2008

(65) Prior Publication Data

US 2009/0028011 A1  Jan. 29, 2009

(30) Foreign Application Priority Data

Jun. 18, 2007  (JP) .............................. 2007-159658

(51) Int. Cl.
*G11B 7/00* (2006.01)

(52) U.S. Cl. .............. 369/44.32; 369/44.18; 369/44.29; 369/47.28; 369/53.17; 369/53.23

(58) Field of Classification Search .............. 369/44.32, 369/44.18, 44.28, 44.27, 44.29, 47.28, 53.17, 369/53.23; 360/77.04
See application file for complete search history.

(56) References Cited

U.S. PATENT DOCUMENTS

| | | | | |
|---|---|---|---|---|
| 6,307,822 B1 * | 10/2001 | Shim et al. | ............... | 369/47.18 |
| 6,813,227 B2 * | 11/2004 | Cho et al. | ................ | 369/44.28 |
| 2002/0131339 A1 * | 9/2002 | Kadlec et al. | ............. | 369/44.27 |
| 2003/0031100 A1 * | 2/2003 | Kadlec et al. | ............. | 369/44.29 |
| 2003/0133220 A1 * | 7/2003 | Hsin | ........................ | 360/77.04 |
| 2006/0291345 A1 * | 12/2006 | Cheng | ..................... | 369/44.27 |
| 2007/0002711 A1 * | 1/2007 | Cheng | ..................... | 369/53.23 |
| 2007/0091747 A1 * | 4/2007 | Ueno | ....................... | 369/47.28 |
| 2008/0165648 A1 * | 7/2008 | Jeong et al. | .............. | 369/53.17 |

FOREIGN PATENT DOCUMENTS

JP  2002-140876  5/2002

* cited by examiner

*Primary Examiner*—Thuy N Pardo
(74) *Attorney, Agent, or Firm*—Townsend and Townsend and Crew LLP

(57) ABSTRACT

An optical disk as disclosed herein includes, among other things, a summing module that sums a compensation signal to a predetermined signal in a servo loop. The compensation signal compensates for a periodical disturbance input into a servo system of the optical disk device in units of a rotation angle of the disk rotating module. A phase lead imparting module imparts a predetermined amount of phase lead to an output signal from an optical detector module and outputs the predetermined amount of phase lead as the compensation signal. The predetermined amount of phase lead is determined in accordance with the rotation period information. The optical disk device performs an accurate iterative learning control to provide stable servo performance. The iterative learning control is performed such that the signal having imparted an optimal amount of phase lead in accordance with the rotation period information is added to the servo loop.

18 Claims, 12 Drawing Sheets

OPTICAL DISK DEVICE

BACKGROUND

The present invention relates to an optical disk device that performs recording or playback of information on an optical disk.

One cause of a servo track-following error in an optical disk device is a periodical disturbance that is caused with the rotation of an optical disk. Conventionally, the process of iterative learning control is known as one process or method of improving the track—following performance against the periodical disturbance. According to Japanese Unexamined Patent Application Publication No. 2002-140876, the iterative learning control refers to the process of control in which a servo error signal is delayed (or lagged) by a rotation period of the optical disk and then is summed to an un-delayed servo error signal, and the summed signal is supplied as a new servo error signal to a stabilization compensator. In addition, there is disclosed a configuration in which a digital memory is used. More specifically, in the disclosed configuration, the signal is stored into the digital memory in units of either an equal time period or a rotation angle of the optical disk, and the signal is delayed and output corresponding to the time period or the rotation angle of the optical disk.

Further, there is known a technique where low pass filter is provided that removes high frequency components contained in the servo error signal, in which a signal passed through the low pass filter is delayed and summed to a servo error signal not passing through the low pass filter, thereby to secure stability.

SUMMARY

Japanese Unexamined Patent Application Publication No. 2002-140876 describes to the effect that "when imparting a delay to a signal passed through the low pass filter, since a phase lag (time lag) due to the low pass filter is present, the track-following performance is increased higher when the delay time is set to a time period smaller by the delay time due to the low pass filter than when setting to a time period identical to the rotation period of the recording medium." This is because the performance of the iterative learning control is improved in the manner that the delay time of the signal caused when the signal passes through the low pass filter is summed after the phase corresponding to the time delay is advanced or led to compensate for the delay time.

Actually, however, it was found that a delay time is caused also in the storing module. Where a zero-order hold sampling period of the storing module is represented by $T_{mem}$, a Fourier transform of a waveform for zero-order holding is expressed as Equation (1) below.

$$\int_0^{T_{mem}} e^{-j\varpi t} dt = T \frac{\sin\frac{\varpi T_{mem}}{2}}{\frac{\varpi T_{mem}}{2}} e^{-j\frac{\varpi T_{mem}}{2}} \quad (1)$$

In accordance with Equation (1), a phase lag is expressed as Equation (2) below.

$$\theta_{delay}(\omega) = \frac{\omega T_{mem}}{2} \quad (2)$$

In addition, a delay time $T_{d\_mem}$ is expressed as Equation (3) below.

$$T_{d\_mem} = \frac{2\pi}{\omega} \times \theta_{delay}(\omega) = \frac{2\pi}{\omega} \times \frac{\theta_{delay}}{2\omega} = \frac{T_{mem}}{2} \quad (3)$$

Where the delay time in the low pass filter is represented by $T_{d\_LPF}$, the total sum of the delay times of the signal passed through the low pass filter and the storing module is the sum of the delay time $T_{d\_LPF}$ due to the low pass filter and the delay time $T_{d\_mem}$ due to a zero-order hold property in the storing module. Hence, an optimal value $T_{lead}$ of a phase lead amount that is to be imparted by the phase lead imparting module is expressed as Equation (4) below.

$$T_{lead} = T_{d\_LPF} + \frac{T_{mem}}{2} \quad (4)$$

With the phase lead $T_{lead}$ imparted, a compensation signal obtained by compensation for the signal delay can be generated. Thereby, the timing of summing of the signal to the servo loop can be accurately adjusted, so that the performance of the iterative learning control can be improved.

In the configuration in which the signal is stored by the storing module in units of the rotation angle of the optical disk, when N times of sampling (N=natural number) is performed on the basis of one rotation of the optical disk, a sampling period (time) $T_{mem}$ in the storing module is a N-divided time of a rotation period $T_{rot}$. Consequently, it is expressed as Equation (5) shown below.

$$T_{lead} = T_{d\_LPF} + \frac{T_{rot}}{2N} \quad (5)$$

In the case of CLV (constant linear velocity) rotation in which the rotation period $T_{rot}$ is different in the inner circumference and the outer circumference, the optimal value $T_{lead}$ to be imparted by the phase lead imparting module varies depending on the radial position, as is apparent from Equation (5).

In the case disclosed in the Patent Publication 1, since the delay time $T_{d\_mem}$ is not taken into consideration, when the radial position of the optical disk varies during the CLV rotation, the rotation period varies. Hence, it is difficult to improve the performance of the iterative learning control, and the iterative learning control cannot be accurately performed.

As such, there arises a necessity for accurately performing the iterative learning control even during the CLV rotation in which the rotation period is different in the inner and outer circumferences of the optical disk.

One object of the present invention is to improve the track-following performance of an optical disk device.

As one example, the object of the present invention can be achieved by taking the delay time in a storing module such as described above.

According to one embodiment of the present invention, there is provided an optical disk device for performing recording or playback of information by irradiating a laser beam on an optical disk. The optical disk device includes an optical detector module that outputs an electric signal corresponding to an amount of reflected light from the optical disk; a servo error signal generating module that generates a servo error signal from an output signal of the optical detector module; a control module that executes feedback control by generating a driving signal that drives a servo actuator in accordance with the servo error signal; a disk rotating module that rotates the optical disk; a rotation synchronous signal generating module that generates a signal synchronous with the rotation from an output of the disk rotating module; a rotation period information acquiring module that acquires rotation period information of the optical disk; a summing module that sums a compensation signal to a predetermined signal in a servo loop, the compensation signal being used to compensate for a periodical disturbance input into a servo system of the optical disk device in units of a rotation angle of the disk rotating module; a storing module that stores an output signal of the summing module in a zero-order hold manner, synchronously with the output signal of the rotation synchronous signal generating module; and a phase lead imparting module that imparts a predetermined amount of phase lead to the output signal of the storing module and that outputs the predetermined amount of phase lead as the compensation signal. The predetermined amount of phase lead is determined in accordance with the rotation period information.

The phase lead imparting module preferably imparts an amount of phase lead corresponding to a delay time due to a zero-order hold property in the storing module.

The phase lead imparting module preferably imparts an identical amount of phase lead within a period during which a radial position of the optical disk place as an object of recording or playback being performed by the optical disk device is within a predetermined range.

The amount of phase lead to be imparted by the phase lead imparting module is preferably adjusted with a time resolution shorter than half of a zero-order hold period in the storing module.

The rotation period information acquiring module preferably acquires address information of the optical disk being irradiated with the laser beam, from a rotation synchronous signal output of the optical detector module.

The rotation period information acquiring module preferably calculates rotation period information from an output of the disk rotating module.

The servo error signal is preferably a radial tracking error signal, and the output signal of the phase lead imparting module is preferably summed to a radial tracking servo loop.

The servo error signal is preferably an axial tracking error signal; and the output signal of the phase lead imparting module is preferably summed to an axial tracking servo loop.

According to another embodiment of the present invention, there is provided an optical disk device for performing recording or playback of information by irradiating a laser beam on an optical disk. The optical disk device includes an optical detector module that outputs an electric signal corresponding to an amount of reflected light from the optical disk; a servo error signal generating module that generates a servo error signal from an output signal of the optical detector module; a control module that executes feedback control by generating a driving signal that drives a servo actuator in accordance with the servo error signal; a disk rotating module that rotates the optical disk; a rotation synchronous signal generating module that generates a signal synchronous with the rotation from an output of the disk rotating module; a rotation period information acquiring module that acquires rotation period information of the optical disk; a summing module that sums a compensation signal to a predetermined signal in a servo loop, the compensation signal being used to compensate for a periodical disturbance input into a servo system of the optical disk device in units of a rotation angle of the disk rotating module; a storing module that stores an output signal of the summing module in a zero-order hold manner, synchronously with the output signal of the rotation synchronous signal generating module; a phase lead imparting module that imparts a predetermined amount of phase lead to the output signal of the storing module and that outputs the predetermined amount of phase lead as the compensation signal; and a low pass filter at least on any one of an input side and an output side of the storing module, wherein the predetermined amount of phase lead is determined in accordance with the rotation period information.

The phase lead imparting module preferably imparts an amount of phase lead corresponding to the sum of a delay time due to the low pass filter and a delay time due to a zero-order hold property in the storing module.

The low pass filter preferably has a linear phase property at least in a pass band.

The phase lead imparting module preferably imparts an identical amount of phase lead within a period during which a radial position of the optical disk place as an object of recording or playback being performed by the optical disk device is within a predetermined range.

The amount of phase lead to be imparted by the phase lead imparting module is preferably adjusted with a time resolution shorter than half of a zero-order hold period in the storing module.

The rotation period information acquiring module preferably acquires address information of the optical disk being irradiated with the laser beam, from a rotation synchronous signal output of the optical detector module thereby to calculate rotation period information.

The rotation period information acquiring module preferably calculates rotation period information from an output of the disk rotating module.

The servo error signal is preferably a radial tracking error signal, and the output signal of the phase lead imparting module is preferably summed to a radial tracking servo loop.

The servo error signal is preferably an axial tracking error signal; and the output signal of the phase lead imparting module is preferably summed to an axial tracking servo loop.

According to still another embodiment of the present invention, there is provided an optical disk device for recording information onto an optical disk or playback or playing back information from the optical disk. The optical disk device includes a detector that detects reflected light from the optical disk; a servo error signal generating circuit that generates an servo error signal in accordance with an output of the detector; a control module that controls a servo actuator in accordance with the servo error signal; a summing circuit that sums a compensation signal corresponding to a periodical disturbance of the optical disk to a predetermined signal in a servo loop; a memory that stores an output signal of the summing circuit; and an adjusting circuit that adjusts a timing of summing the compensation signal in the summing circuit in correspondence to a delay time in the memory.

According to the present invention, the track-following performance of an optical disk device can be improved.

BRIEF DESCRIPTION OF THE DRAWING

These and other features, objects and advantages of the present invention will become more apparent from the following description when taken in conjunction with the accompanying drawings wherein.

DETAILED DESCRIPTION OF PREFERRED EMBODIMENTS

Embodiments of the present invention will be described with reference to the accompanying drawings.

The present invention is adaptable to both tracking control ("radial tracking control," hereinbelow) and focus control ("axial tracking control," hereinbelow). However, description will be provided hereinbelow with reference to an example of the axial tracking control.

First Embodiment

A first embodiment of the present invention will be described hereinbelow.

Figure 1:
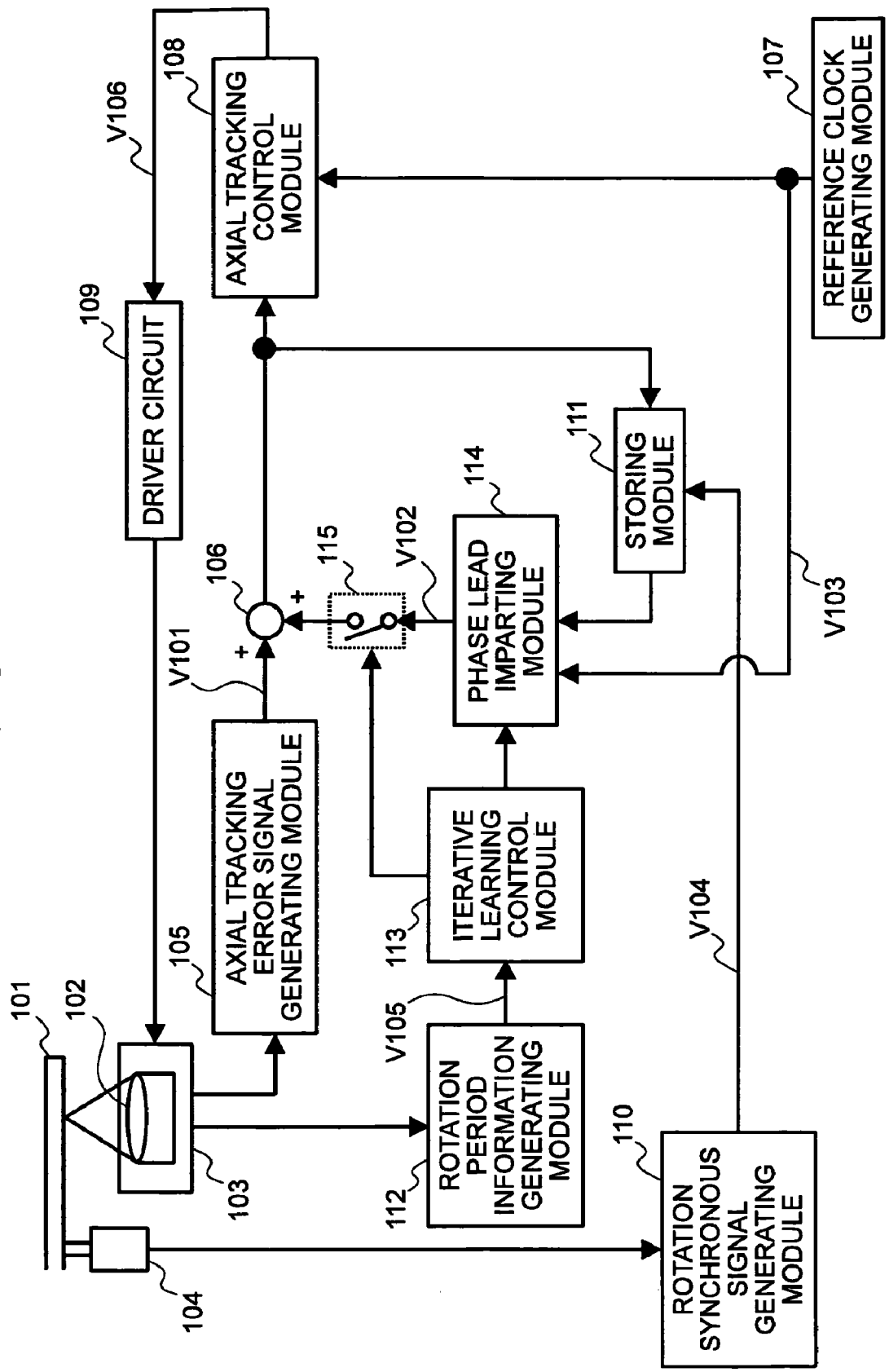
FIG. 1 is a block diagram showing a first embodiment of the present invention.

FIG. 1 is a block diagram showing an optical disk device according to the present embodiment.

Reference character 101 denotes an optical disk on which information read, erase, or write is performed with a laser beam being irradiated.

Reference character 102 denotes an objective lens that focuses the laser beam onto the recording surface of the optical disk 101.

Reference character 103 is an optical pickup that includes a focus actuator (not shown). The optical pickup 103 further include an optical detector (not shown) that detects light reflected off the optical disk 101 and that in turn outputs an electric signal corresponding to the amount of the reflected light.

Reference character 104 denotes a spindle motor 104 that drives the optical disk 101 to rotate at a predetermined linear velocity. The rotation period is represented by $T_{rot}$.

Reference character 105 denotes an axial tracking error signal generating module that generates an axial tracking error signal V101 from the output signal of the optical detector (not shown) present in the optical pickup 103, and outputs the axial tracking error signal V101.

Reference character 106 is a summing module that sums together the axial tracking error signal V101 and a signal that is output from a compensated-signal output switch 115 described further below.

Reference character 107 denotes a reference clock generating module that generates a reference clock signal V103 having a 50% duty ratio and a fixed period Ts.

Reference character 108 denotes an axial tracking control module (digital control block) that operates in accordance with the reference clock signal V103. More specifically, the axial tracking control module 108 compensates the output signal of the summing module 106 for phase and gain, and generates a driving signal V106.

Reference character 109 denotes a driver circuit that amplifies the driving signal V106, which is output by the axial tracking control module 108, and outputs the amplified driving signal V106 to the focus actuator of the optical pickup 103.

Reference character 110 denotes a rotation synchronous signal generating module that generates a rotation synchronous signal V104 from the output signal of the spindle motor 104. The rotation synchronous signal V104 has the 50% duty ratio as described above, and has a period of $T_{rot}/N$ (N=natural number).

Reference character 111 is a storing module 111 that extracts the output signal of the summing module 106 and stores thereinto the values of signals by dividing one rotation by N (N-division of one rotation) (N=natural number) in accordance with the rotation synchronous signal V104.

Reference character 112 denotes a rotation period information generating module that acquires address information of the optical disk 101, on which the laser beam is being irradiated, from an output signal of the optical pickup 103, and generates rotation period information 105.

Reference character 113 denotes an iterative learning control module that performs iterative learning control by using the rotation period information V105 as an input. A general-use CPU (central processing unit) can be used as the iterative learning control module 113.

Reference character 114 denotes a phase lead imparting module that imparts a predetermined amount of phase lead to the output of the storing module 111 and outputs a compensation signal V102 in accordance with an instruction of the iterative learning control module 113. The compensation signal V102 is used to compensate for a periodical disturbance input into a servo system.

Reference character 115 denotes a compensation signal output switch that uses the compensation signal V102 as an input and that switches between outputting and non-outputting events for the compensation signal V102 in accordance with an instruction of the iterative learning control module 113. When the compensation signal output switch 115 is off, a signal voltage at a zero level is output.

Figure 2:
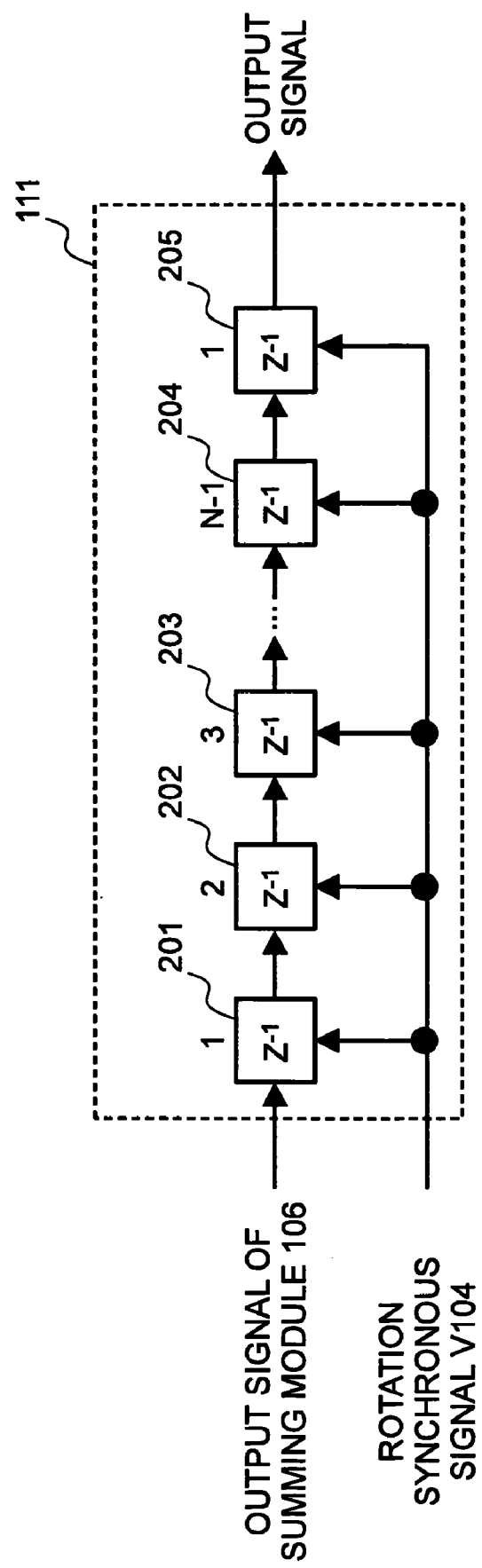
FIG. 2 is a view showing the configuration of a storing module according to the first embodiment of the present invention.

The configuration of the storing module 111 according to the present embodiment will be described hereinbelow with reference to FIG. 2. The storing module 111 is configured including N (natural number) memory elements (respectively shown with numerals 201, 202, . . . , 205 as examples for convenience of description) series connected to one another. The memory elements 201 to 205 are configured into the D-flipflop arrangement, for example. The storing module 111 outputs a value stored in the N-th memory element.

In this case, the respective memory elements 201 to 205 behave in such a manner that, when a rise timing of the rotation synchronous signal V104 is detected, a shift register operation is performed, in which a value stored in a front memory element is shifted to a rear memory element. In this manner, the memory elements 201 to 205 are sequentially updated with a time interval of $T_{rot}/N$.

Figure 3:
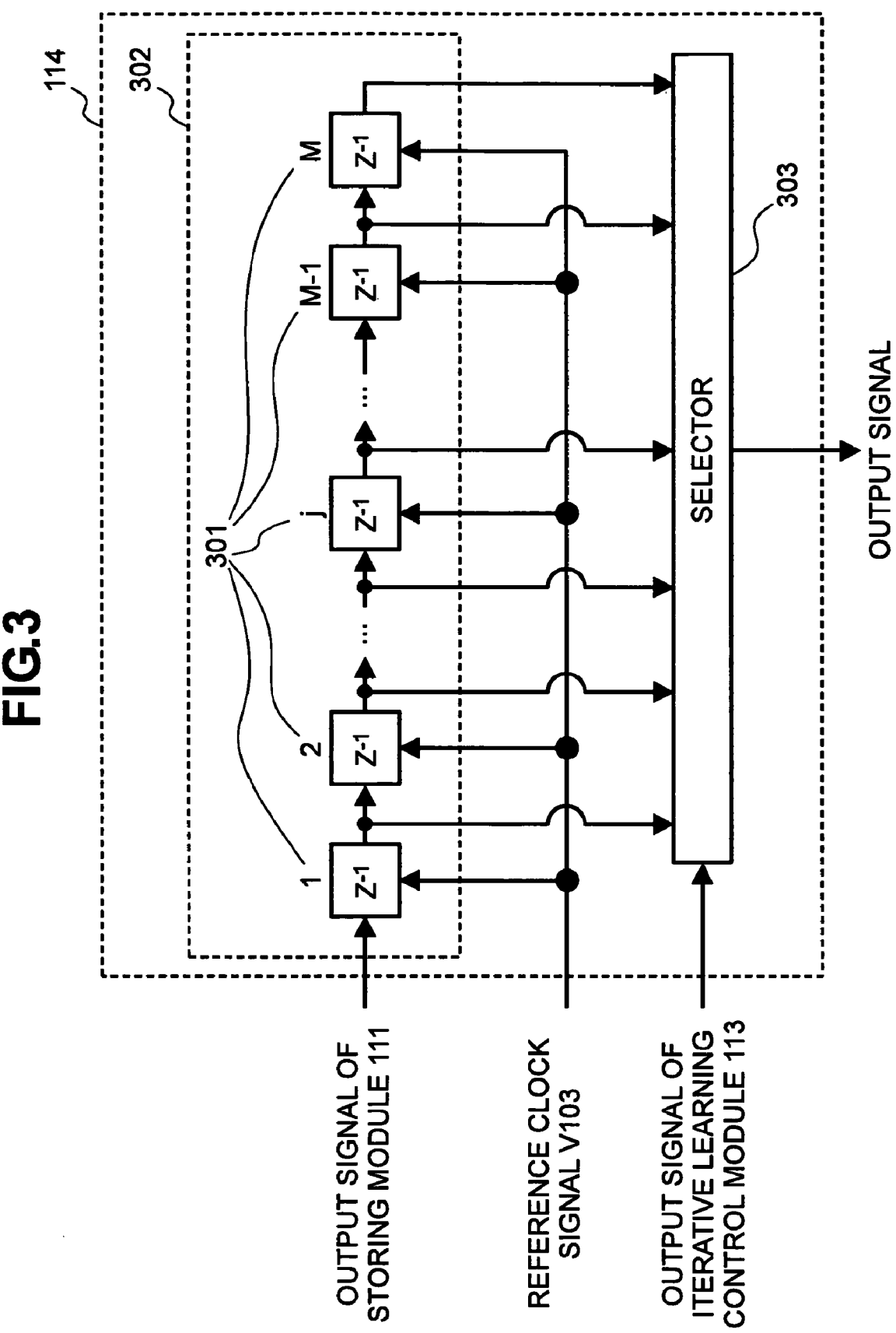
FIG. 3 is a view showing the configuration of a phase lead imparting module according to the first embodiment of the present invention.

The configuration of the phase lead imparting module 114 according to the present embodiment will be described with reference to FIG. 3.

Reference character 301 denotes a respective memory element that is sequentially updated with the rise timing of the reference clock signal V103.

Reference character 302 is a delaying module that is configured including series connected M memory elements 301 (M=natural number), and that outputs output signals of all the M memory elements 301.

Reference character 303 is a selector that selects one of the M signals, which are the outputs of the delaying module 302, and that outputs the selected signal (the number of an input signal to thus be selected is represented by j).

Figure 12:
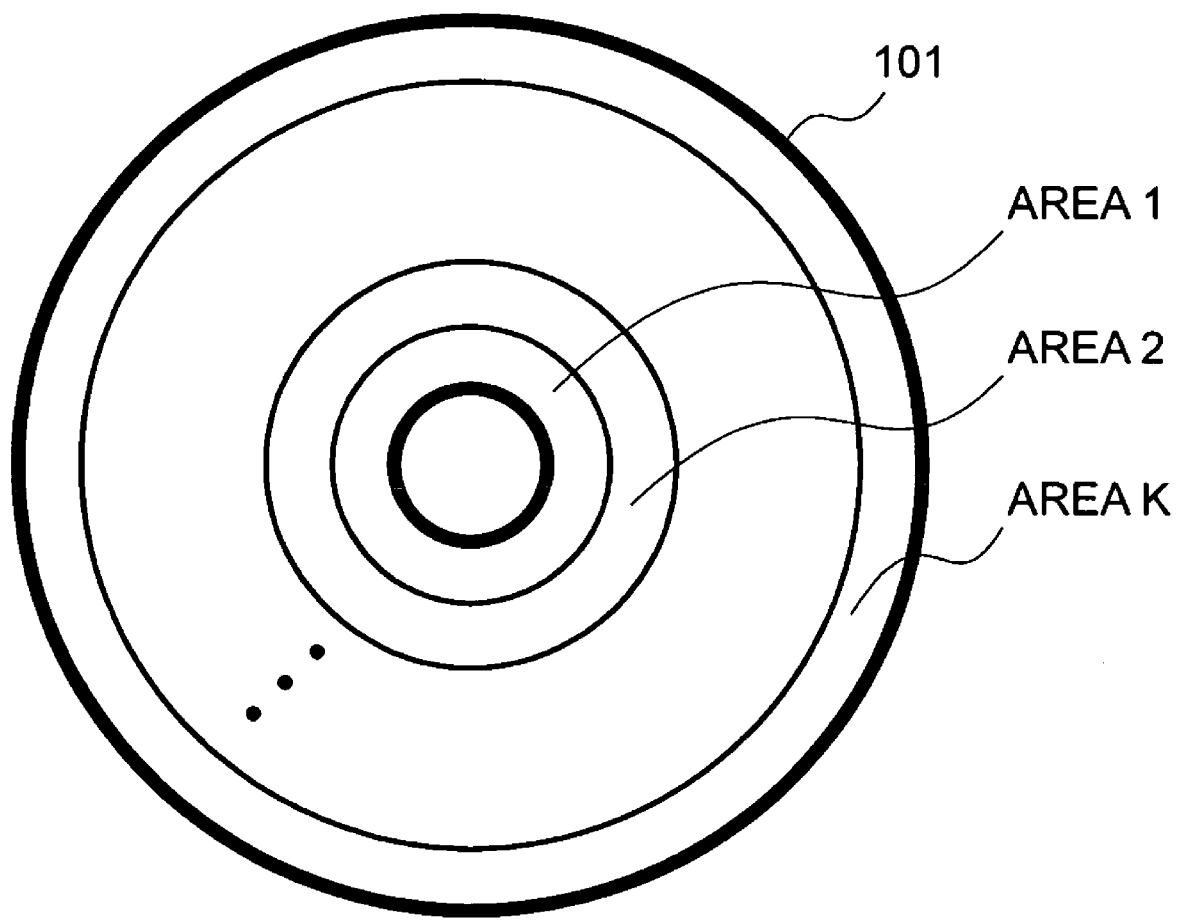
FIG. 12 is a waveform diagram for describing problems to be solved by the present invention.

As shown in FIG. 12, the optical disk 101 according to of the present embodiment is divided into a plurality of or K areas (K=natural number) corresponding to the radial positions. In a period where a light spot is present in the areas, the phase lead imparting module 114 imparts an identical amount of phase lead.

Operation of the iterative learning control module 113 will be described hereinbelow with reference to a flow diagram of the iterative learning control shown in FIG. 4.

Upon start of the iterative learning control (at step S401), it is determined by the iterative learning control module 113 whether a compensation signal V102 stored before one rotation is present (at step S402) (note that the primary control member (113) hereinbelow will not mentioned unless otherwise necessary). If a compensation signal V102 stored before one rotation is not present (that is, if the answer to step S402 is "NO"), then the compensation signal output switch 115 is turned off, and hence no compensation signal V102 is output (step S406).

If a compensation signal V102 stored before one rotation is present (that is, if the answer to step S402 is "YES"), then a determination is made whether the light spot is passed across an area-to-area boundary (at step S403). If no light spot is passed across an area-to-area boundary (that is, if the answer to step S403 is "NO"), then the compensation signal output switch 115 is turned on (at step S405).

Otherwise, if the light spot is passed across an area-to-area boundary (that is, if the answer to step S403 is "YES"), then the output of the selector 303 is controlled (at step S404), and the compensation signal output switch 115 is turned on (at step S405). After the compensation signal output switch 115 has been turned on (at step S405), processing returns to step S402.

Figure 5:
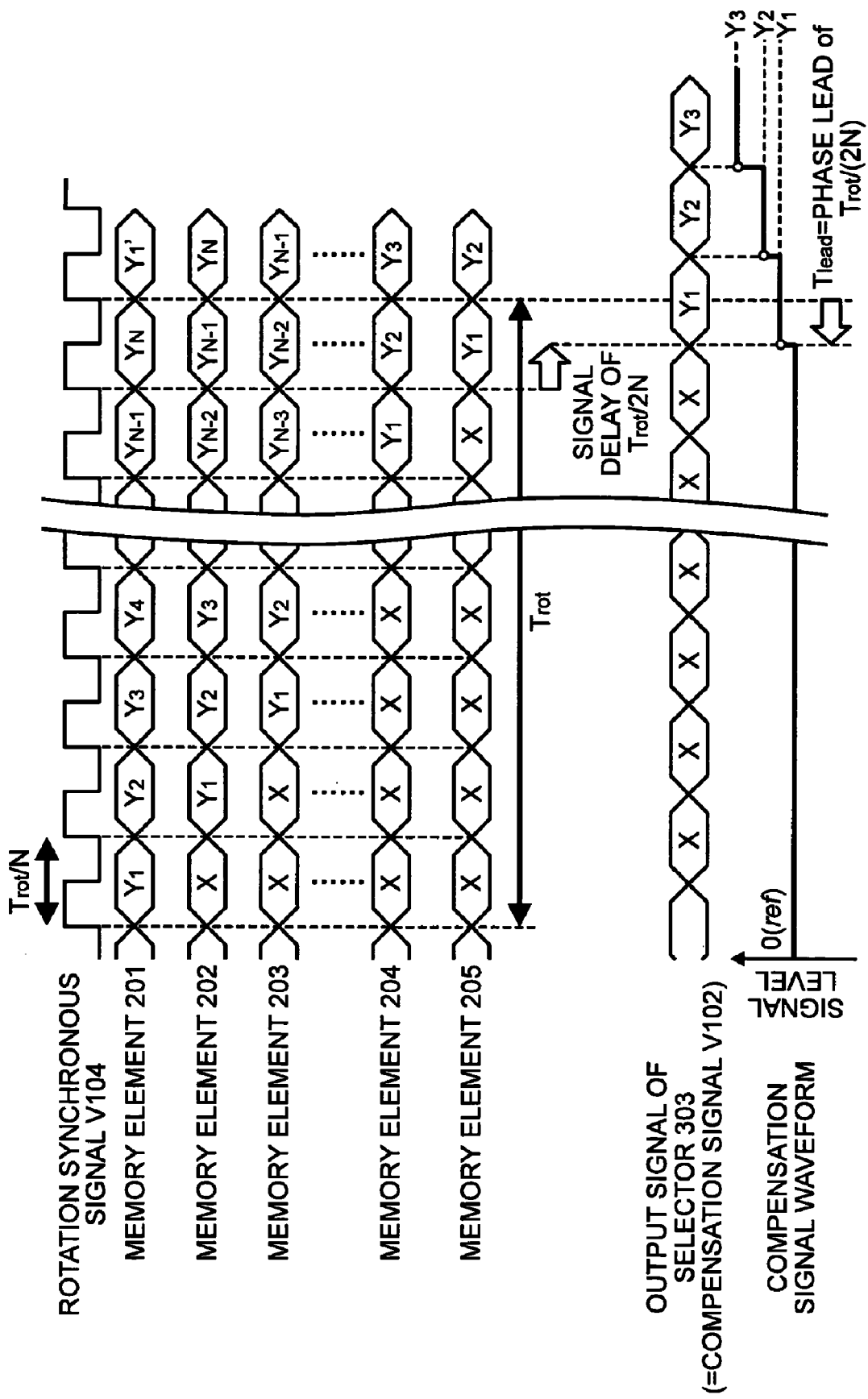
FIG. 5 is a timing chart according to the first embodiment of the present invention.

A method of controlling the output of the selector 303 at step S404 will be described hereinbelow with reference to FIG. 5. FIG. 5 is a timing chart for explaining a method of generating the compensation signal V102, and shows operation being performed until one rotation period $T_{rot}$ elapses after the iterative learning control has been started. $Y_1, Y_2, Y_3, \ldots$, respectively, represent values of signals stored by the storing module 111, and the $Y_1, Y_2, \ldots, Y_N$ correspond to storing of signals corresponding to one rotation. $Y_1'$ represents a value in the event that the signal is again stored at a rotation angle identical to that in the event of storing of $Y_1$ on the optical disk 101. In this regard, the value of a signal unrelated to the operation is represented by X.

As shown in FIG. 5, the respective memory elements 201 to 205 are sequentially updated with a time interval of $T_{rot}/N$. Hence, a value recorded before Trot-Trot/N is stored in an N-th memory element.

Where an optimal value of the amount of phase lead to be imparted by the phase lead imparting module 114 is represented by $T_{lead}$, the phase lead imparting module 114 can output a signal recorded before $T_{rot}$-$T_{lead}$. The optimal value of the amount of phase lead in the present embodiment can be expressed as Equation (6) below in accordance with Equation (5) (shown above in the SUMMARY section).

$$T_{lead} = \frac{T_{rot}}{2N} \quad (6)$$

Accordingly, the signal recorded before $T_{rot}$-$T_{lead}$ can be output by delaying the signal by $T_{rot}/(2N)$ in the delaying module 302.

In order to realize a signal delay of $T_{rot}/(2N)$ in the delaying module 302, j representing the number of the input signal to be selected by the selector 303 can be calculated in accordance with Equation (7) below.

$$j = \text{round}\left(\frac{T_{rot}}{2N \cdot Ts}\right) + 1 \quad (7)$$

(For an argument a, the function round(a) returns to an integer proximal to a.)

The iterative learning control module 113 obtains Trot from the rotation period information V105, and controls the output of the selector 303 located in the phase lead imparting module 114 by use of the number j calculated in accordance with Equation (7). Thereby, a desired amount of phase lead can be imparted by the phase lead imparting module 114.

In accordance with the operation described above, the optical disk device according to the present invention is capable of imparting an optimal amount of phase lead in consideration of the delay time resulting from the zero-order hold property in the storing module 111 in the iterative learning control. Consequently, the performance of the iterative learning control can be improved.

Second Embodiment

A second embodiment of the present invention will be described hereinbelow.

Figure 6:
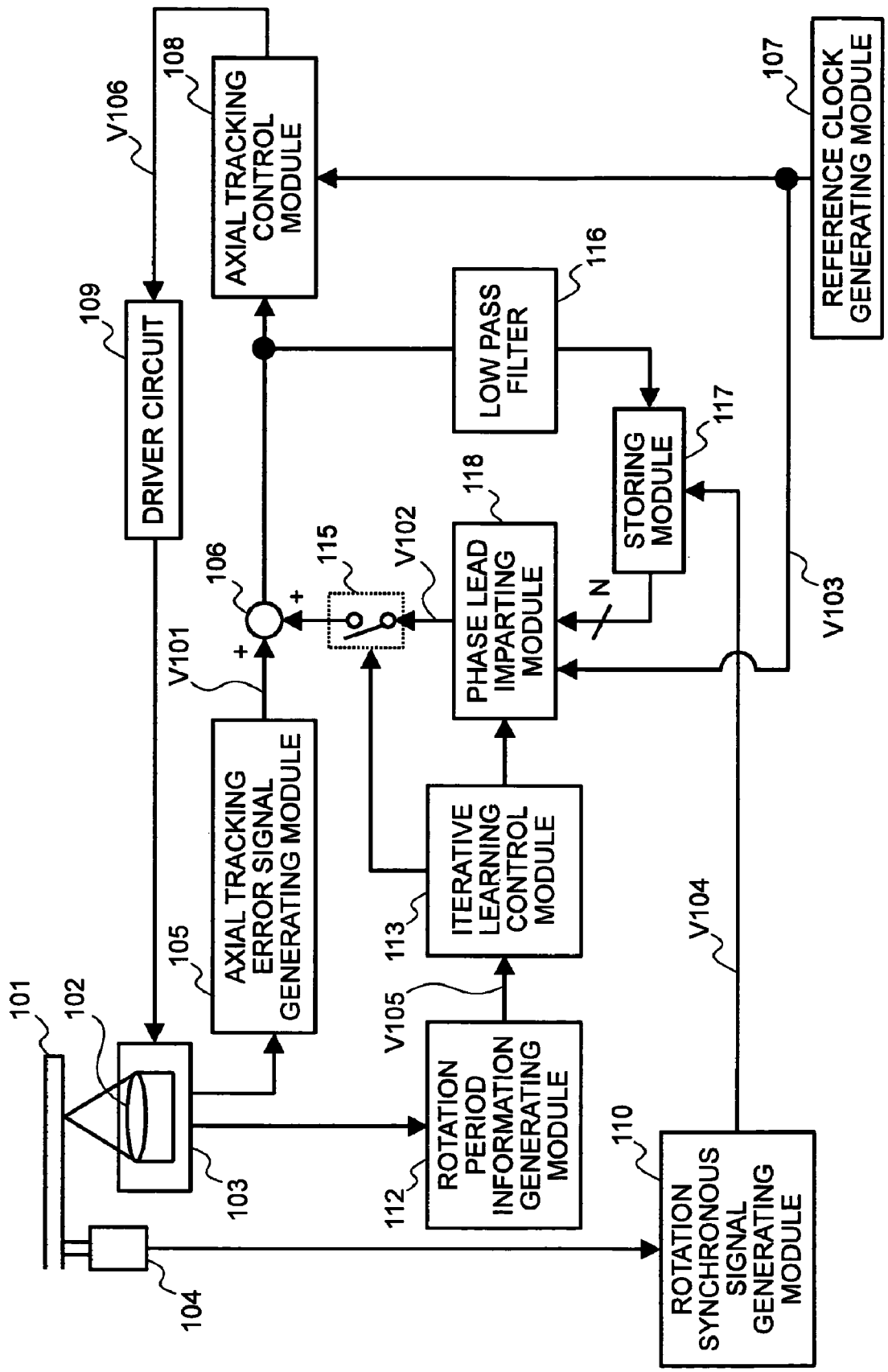
FIG. 6 is a block diagram showing a second embodiment of the present invention.

FIG. 6 is a block diagram showing an optical disk device according to the present embodiment. FIG. 6 is different from FIG. 1 in that a low pass filter 116 is inserted in a forestage of a storing module 117, and an interior configuration of a storing module 117 (corresponding to the storing module 117 of FIG. 7) and a phase lead imparting module 118 (corresponding to the storing module 118 of FIG. 8) are different from those of FIG. 1. Components common to those of FIG. 1 are shown with common reference characters, and repeated descriptions thereof are omitted herefrom.

The low pass filter 116 removes high frequency components contained in an output signal of the summing module 106. In consideration of the fact that the phase lead imparting module 118, which is described further below, the low pass filter 116 is preferably a filter having a linear phase property causing delay times to be constant. Such a filter can be realized as a FIR (finite impulse response) filter. In the case where the filter property causing delay times in all frequencies to be constant cannot be realized, it is preferable that the low pass filter 116 be of the type having the linear phase property at least in a pass band of the low pass filter 116.

The storing module 117 extracts the output signal of the low pass filter 116 and stores by performing N-division of one rotation in accordance with the rotation synchronous signal V104. In addition, the storing module 117 outputs all the N values.

The phase lead imparting module 118 imparts a predetermined amount of phase lead to a signal stored before one rotation in accordance with the N input signals and the rotation period information V105, and outputs a compensation signal V102 in accordance with an instruction of the iterative learning control module 113. The compensation signal V102 is used to compensate for a periodical disturbance input into a servo system.

Figure 7:
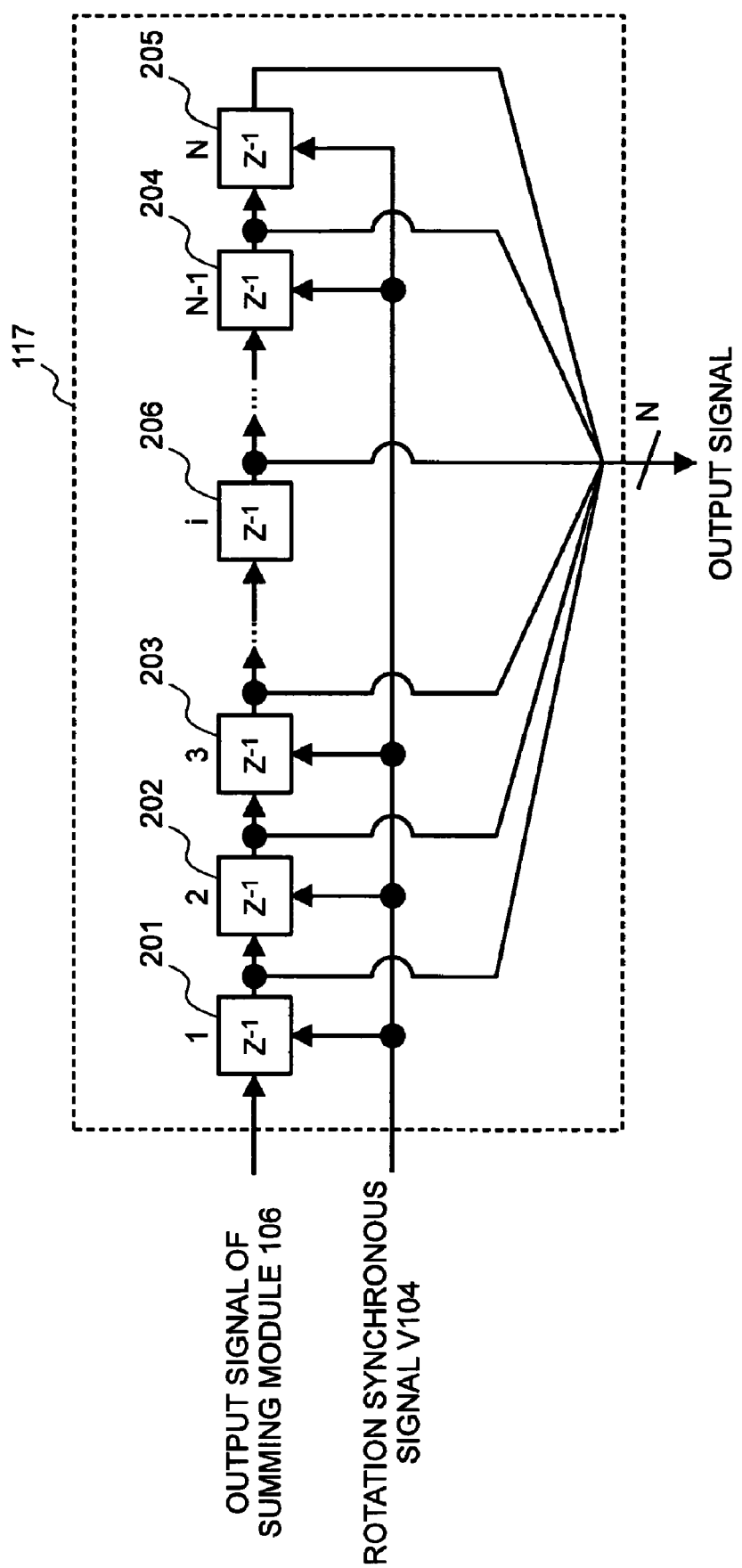
FIG. 7 is a view showing the configuration of a storing module according to the second embodiment of the present invention.

The configuration of the storing module 117 according to the present embodiment will be described hereinbelow with reference to FIG. 7. Components common to those of FIG. 2, which is the view of configuration of the storing module 111 according to the first embodiment, are shown with reference characters, and repeated descriptions thereof are omitted herefrom.

The storing module 117 is configured including N memory elements (respectively shown with numerals 201, 202, . . . , 205 as examples for convenience of description) series connected to one another. The storing module 117 outputs all output signals of all the N memory elements 201 to 205.

Figure 8:
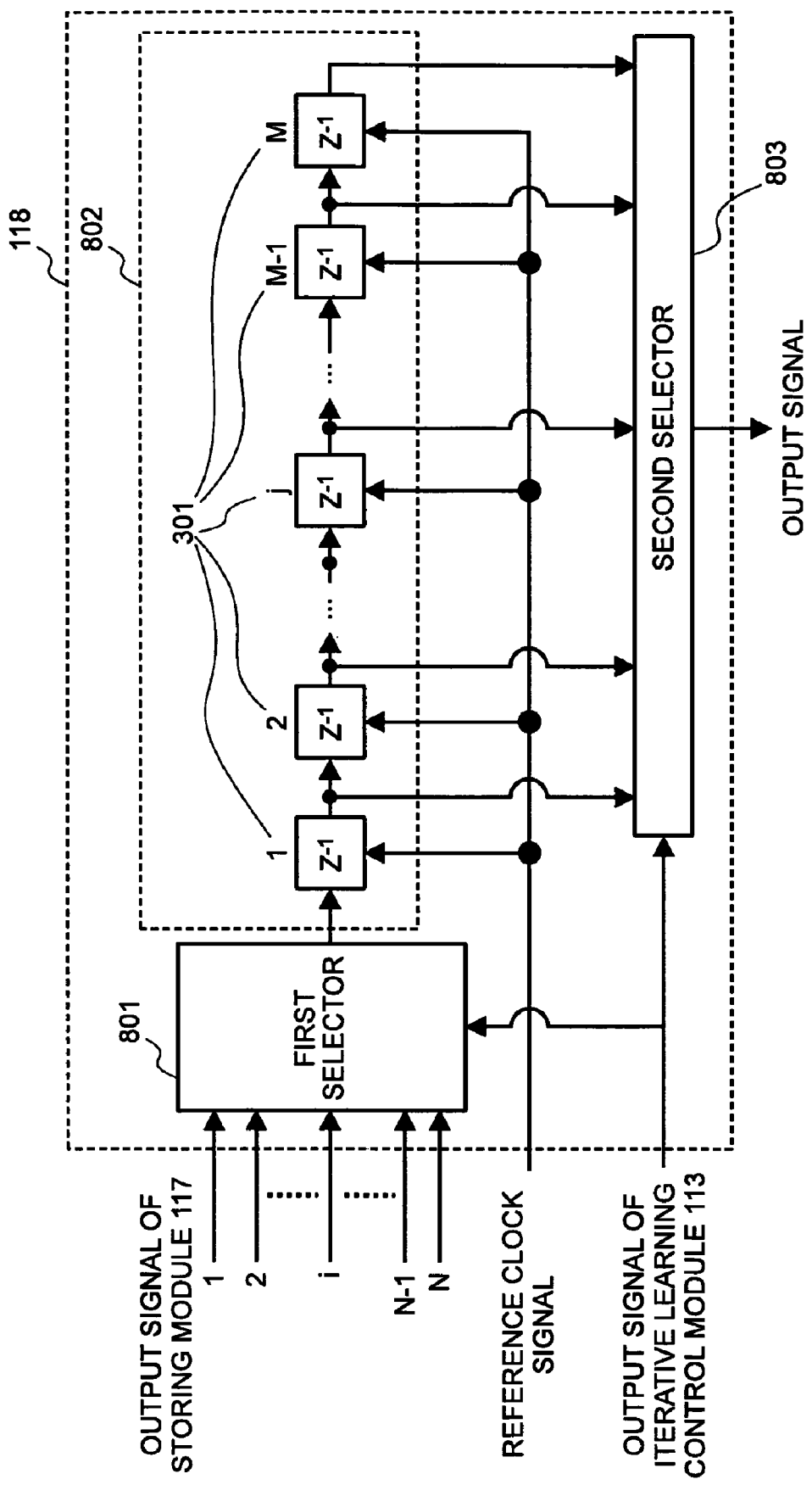
FIG. 8 is a view showing the configuration of a phase lead imparting module according to the second embodiment of the present invention.

The configuration of the phase lead imparting module 118 according to the present embodiment will be described with reference to FIG. 8. Components common to those of FIG. 3, which is the view of configuration of the phase lead imparting module 114 according to the first embodiment, are shown with reference characters, and repeated descriptions thereof are omitted herefrom.

Reference character 801 is a first selector that selects one of the N signals, which are the outputs of the storing module 117, delaying module 802, and outputs the selected signal (the number of an input signal to thus be selected is represented by i).

Reference character 802 is a delaying module that is configured including series connected M memory elements 301 (M=natural number), and that outputs output signals of all the M memory elements 301.

Reference character 803 is a second selector that selects one of the M signals, which are the outputs of the delaying module 802 and that outputs the selected signal (the number of an input signal to thus be selected is represented by j).

Signal waveforms in the respective portions will be described with reference to FIG. 11. In the drawing figure, a circle mark represents a signal per one rotation period, and corresponds to a value of a signal at an identical rotation angle. A delay time in the low pass filter 116 is represented by $T_{d\_LPF}$.

Figure 11:
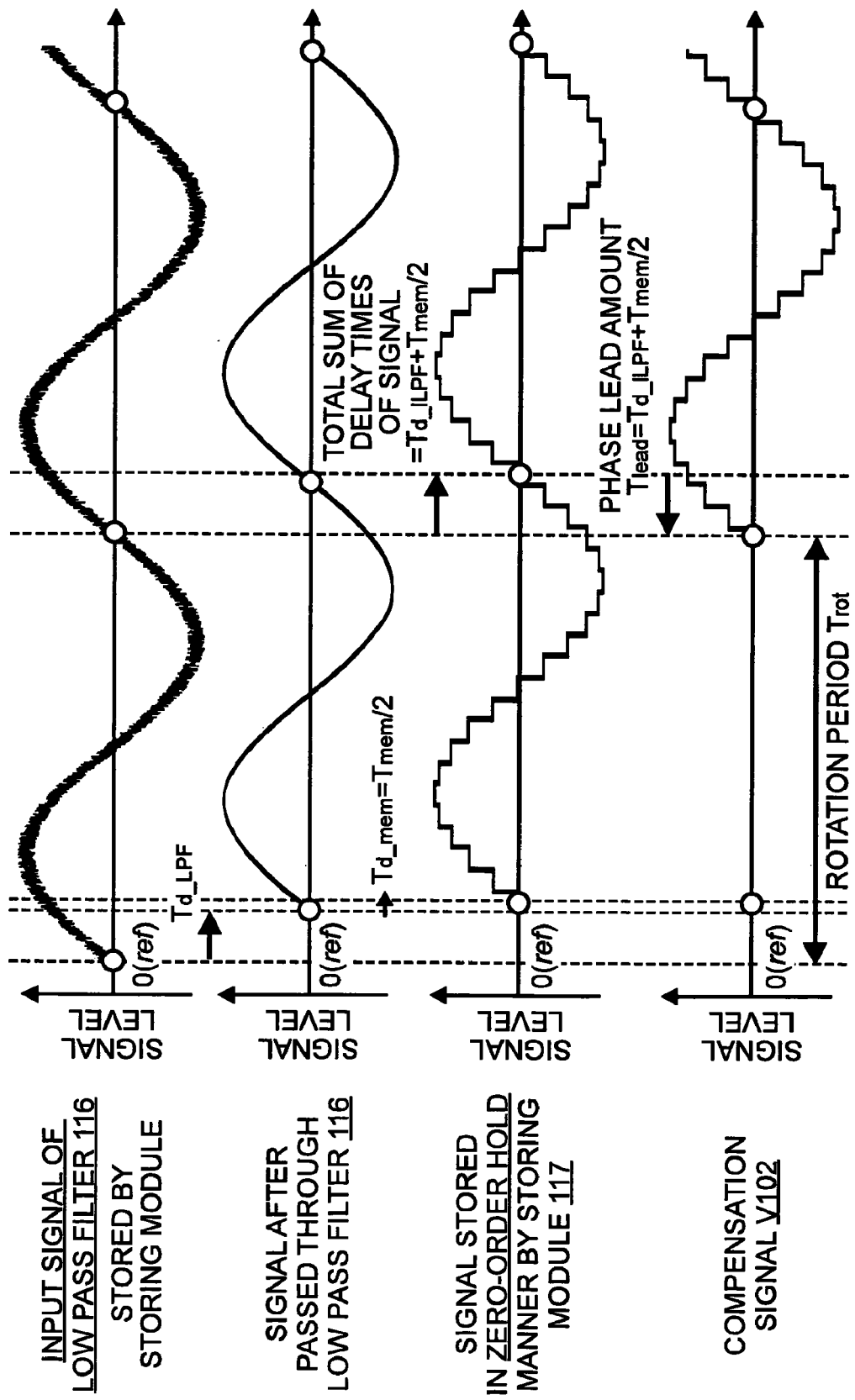
FIG. 11 is a schematic view showing an area dividing method according to the first embodiment of the present invention.

Clearly from FIG. 11, the total sum of delay times of a signal due to passing through the low pass filter 116 and the storing module 117 is the sum of the delay time $T_{d\_LPF}$ due to the low pass filter 116 and a lag time $T_{d\_mem}$ due to the zero-order hold property in the storing module 117. Accordingly, an optimal value $T_{lead}$ of an amount of phase lead to be imparted in the phase lead imparting module 118 is calculated in accordance with Equation (4) (shown in the SUMMARY section). The compensation signal V102 formed by compensating for the signal delay can be generated in the phase lead imparting module 118 by imparting the phase lead amount $T_{lead}$ calculated in accordance with Equation (4). Thereby, the performance of the iterative learning control can be improved.

Figure 9:
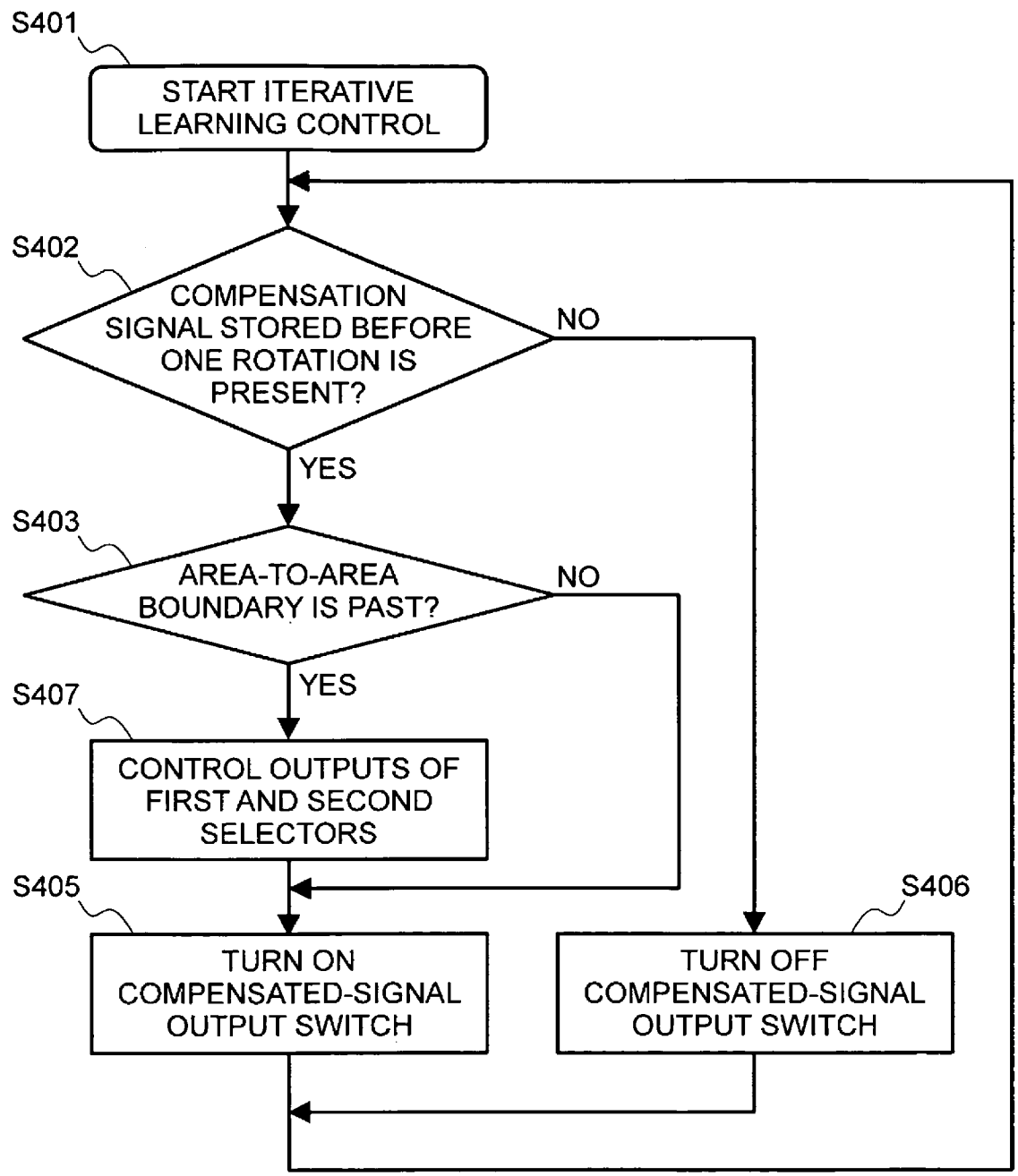
FIG. 9 is a flow diagram according to the second embodiment of the present invention.

Operation of the iterative learning control module 113 will be described hereinbelow with reference to a flow diagram of the iterative learning control shown in FIG. 9.

Figure 4:
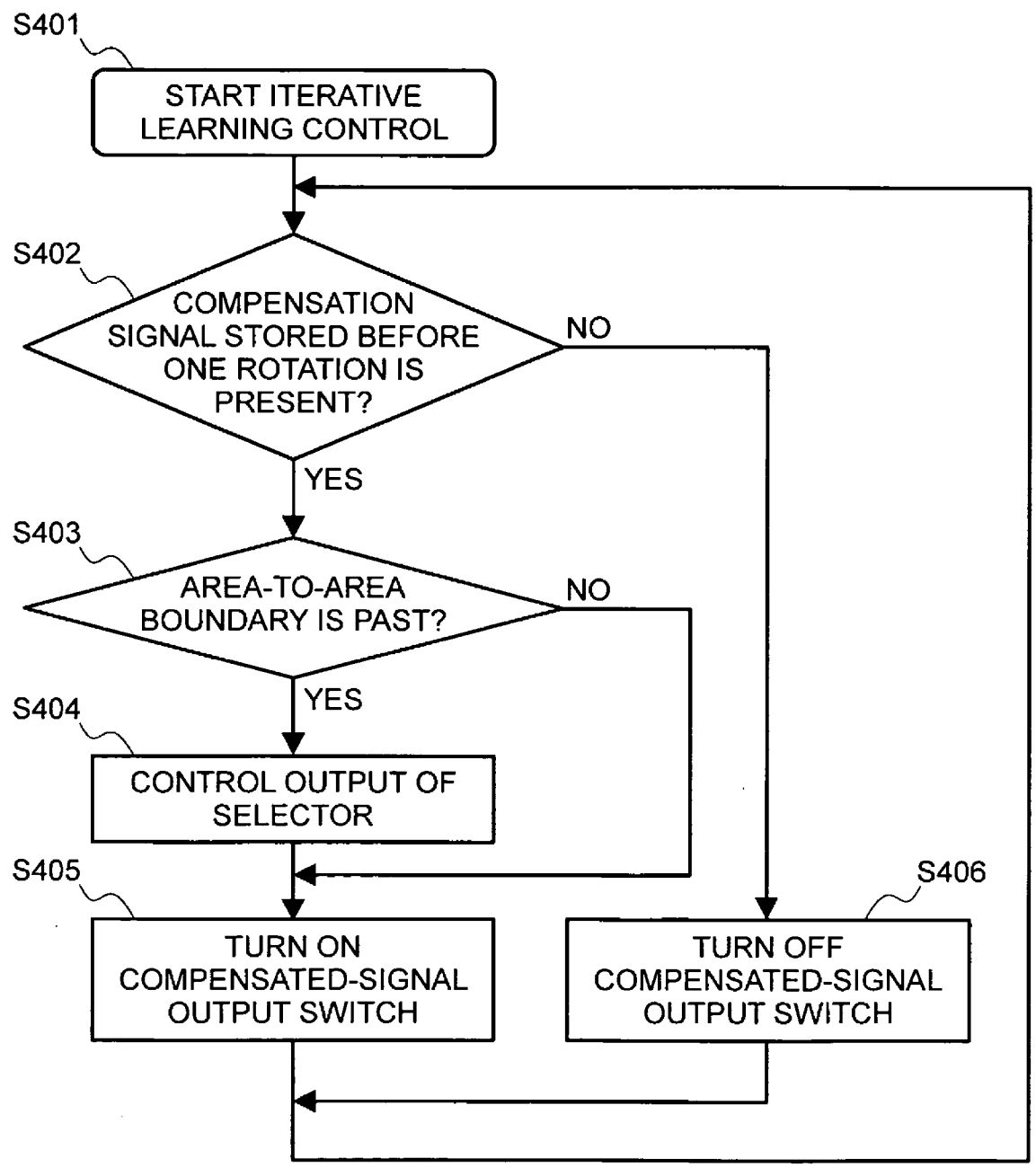
FIG. 4 is a flow diagram according to the first embodiment of the present invention.

The flow diagram is the same up to step S403 as the flow diagram of FIG. 4 in the first embodiment.

If no light spot is passed across an area-to-area boundary (that is, if the answer to step S403 is "NO"), then the compensation signal output switch 115 is turned on by the iterative learning control module 113 (at step S405). Otherwise, if the light spot is passed across an area-to-area boundary (that is, if the answer to step S403 is "YES"), then the outputs of the first and second selectors 801 and 803 are controlled (at step S407). After step S407, the compensation signal output switch 115 is turned on (at step S405), and the processing returns to step S402.

Figure 10:
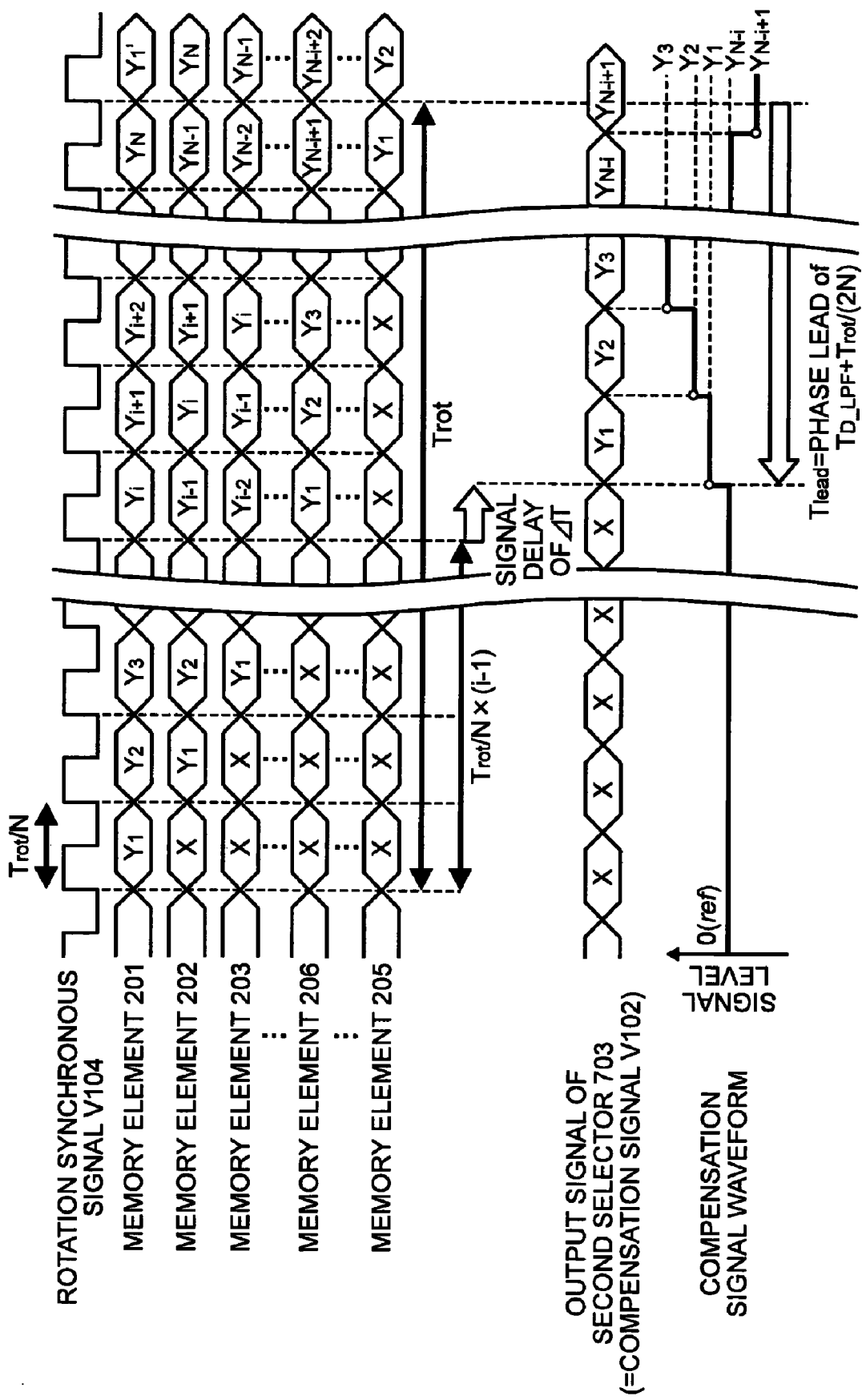
FIG. 10 is a timing chart according to the second embodiment of the present invention.

A method of controlling the outputs of the respective first and second selectors 801 and 803 will be described hereinbelow with reference to FIG. 10. FIG. 10 is a timing chart for explaining a method of generating the compensation signal V102, and shows operation being performed until one rotation period $T_{rot}$ elapses after the iterative learning control has been started. $Y_1, Y_2, Y_3, \ldots$, respectively, represent values of signals stored by the storing module 117, and the $Y_1, Y_2, \ldots, Y_N$ correspond to storing of signals corresponding to one rotation. $Y_1'$ represents a value in the event that the signal is again stored at a rotation angle identical to that in the event of storing of $Y_1$ on the optical disk 101. In this regard, the value of a signal unrelated to the operation is represented by X.

Where an optimal value of the amount of phase lead being imparted by the phase lead imparting module 118 is represented by $T_{lead}$, the phase lead imparting module 118 can output a signal recorded before $T_{rot}-T_{lead}$. As such, in accordance with the rotation period information V105, the phase lead imparting module 118 calculates the number i of an input signal to be selected by the first selector 801, which is located in the phase lead imparting module 118, and the number j of an input signal to be selected by the second selector 803, which is located in the phase lead imparting module 118. Then, the phase lead imparting module 118 imparts a desired amount of phase lead, and outputs a signal recorded before $T_{rot}-T_{lead}$.

A calculation method for calculating the numbers i and j of input signals to be selected by the respective first and second selectors 801 and 803 will be described hereinbelow.

Where the delay time in the low pass filter 116 is represented by $T_{d\_LPF}$, an optimal value of the amount of phase lead, which is to be imparted by the phase lead imparting module 118 according to the present embodiment, is expressed as Equation (8) below in accordance with Equation (5) (shown in the SUMMARY section).

$$T_{lead} = T_{d\_LPF} + \frac{T_{rot}}{2N} \qquad (8)$$

According to the selection by the first selector 801, the delay can be imparted through a time resolution of operation periods $T_{mem}$ of the memory elements 201 to 205, which constitute the storing module 117. More specifically, where the number of the input (signal) to be selected by the first selector 801 is represented by i, a delay of "$T_{mem} \times (i-1)$" is imparted.

However, as can be clearly known from Equation (4), the present embodiment is to accomplish improvement of the performance of the iterative learning control by adjusting the amount of phase lead at an accuracy of at least $T_{mem}/2$. Hence, in the event of imparting the delay time only through the signal selection in the first selector 801, the time resolution is insufficient. In order to compensate for the insufficiency, the delaying module 802 is provided.

An operation period Ts of the memory elements 301 is shorter than the operation period of the memory elements 201 to 205. Hence, with the delaying module 802 being used, the amount of phase lead can be adjusted through the time resolution of Ts shorter than $T_{mem}$.

In order to reduce the number of the memory elements 301, which constitute the delaying module 802, the maximum value of the delay time that can be imparted by the delaying module 802 can be set to $T_{mem}$. In order to achieve this, the number i of an input signal to be selected by the first selector 801 can be obtained in accordance with Equation (9).

$$i = \text{floor}\left(\frac{T_{rot} - T_{lead}}{\frac{T_{rot}}{N}}\right) + 1 \quad (9)$$

(For an argument a, the function floor(a) returns a maximum integer smaller than or equal to a.)

When the delaying module 802 imparts a delay time $\Delta T$ shown in FIG. 10, a signal recorded before $T_{rot}$-$T_{lead}$ can be output. When i is used, $\Delta T$ can be expressed as Equation (10) below.

$$\Delta T = T_{rot} - T_{lead} - \frac{T_{rot}}{N} \times i \quad (10)$$

When $\Delta T$ is used, the number j of the input signal to be selected by the second selector 803 can be expressed as Equation (11).

$$j = \text{round}\left(\frac{\Delta T}{Ts}\right) + 1 \quad (11)$$

The iterative learning control module 113 controls the output of the second selector 803 in accordance with Equation (11).

A desired amount of phase lead can be imparted by the phase lead imparting module 118 in the manner that the outputs of the respective first and second selectors 801 and 803 are controlled by using i and j calculated in accordance with Equations (9) and (10).

With the operation described above, the optical disk device according to the second embodiment is capable of imparting an optimal amount of phase lead in the iterative learning control in consideration of not only the delay time resulting from the zero-order hold property in the storing module 117 but also the delay time in the low pass filter 116. Consequently, the performance of the iterative learning control can be improved.

In the second embodiment, the configuration includes the low pass filter 116 provided on the input side of the storing module 117. However, the configuration may include the low pass filter 116 provided on the output side of the storing module 117. Still alternatively, the configuration may include the low pass filter 116 provided on each of the input and output sides of the storing module 117. Even in these alternative configurations, the present invention can be adapted similarly as in the above-described embodiment.

Further, while, in the configuration of the embodiments described embodiments, the rotation period information generating module 112 operating with the input of the output signal of the optical pickup 103 is provided thereby calculating the rotation period $T_{rot}$, the means for calculating the rotation period is not limited thereto. For example, the configuration may be such that the rotation period $T_{rot}$ is calculated from the output signal of the spindle motor 104.

In the configurations of the embodiments described above, the delaying module in the interior of the phase lead imparting module operates in accordance with the reference clock signal V103. However, in the case where the time resolution of the amount of phase lead set in the phase lead imparting module is longer and hence better than the period Ts of the reference clock signal V103, the configuration may be such that the optical pickup 103 operates in accordance with a frequency-divided signal of the optical pickup 103. This configuration enables reducing the number of the memory elements constituting the delaying module, consequently enabling reducing the circuit size. Further, as is apparent from Equation (4), the performance of the iterative learning control can be improved in the manner that the time resolution of the amount of phase lead is adjusted with a time resolution shorter than half of the zero-order hold period $T_{mem}$.

Further, while, in the configurations of the embodiments described above, the axial tracking control module 108 is the digital control block, the axial tracking control module 108 may be an analog control block.

Further, while the iterative learning control according to the embodiments described above is configured such that the axial tracking error signal V101 is extracted, the configuration may be such that the driving signal V106 is extracted. Still alternatively, the configuration may be such that a signal in the interior of the axial tracking control module is extracted.

Further, it should be apparent that the present invention can be adapted as well to the radial tracking control.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. An optical disk device for performing recording or playback of information by irradiating a laser beam on an optical disk, the optical disk device comprising:
    an optical detector module that outputs an electric signal corresponding to an amount of reflected light from the optical disk;
    a servo error signal generating module that generates a servo error signal from an output signal of the optical detector module;
    a control module that executes feedback control by generating a driving signal that drives a servo actuator in accordance with the servo error signal;
    a disk rotating module that rotates the optical disk;
    a rotation synchronous signal generating module that generates a signal synchronous with the rotation from an output of the disk rotating module;
    a rotation period information acquiring module that acquires rotation period information of the optical disk;
    a summing module that sums a compensation signal to a predetermined signal in a servo loop, the compensation signal being used to compensate for a periodical disturbance input into a servo system of the optical disk device in units of a rotation angle of the disk rotating module;
a storing module that stores an output signal of the summing module in a zero-order hold manner, synchronously with the output signal of the rotation synchronous signal generating module; and
a phase lead imparting module that imparts a predetermined amount of phase lead to the output signal of the storing module and that outputs the predetermined amount of phase lead as the compensation signal, wherein
the predetermined amount of phase lead is determined in accordance with the rotation period information.

2. An optical disk device according to claim 1, wherein the phase lead imparting module imparts an amount of phase lead corresponding to a delay time due to a zero-order hold property in the storing module.

3. An optical disk device according to claim 1, wherein the phase lead imparting module imparts an identical amount of phase lead within a period during which a radial position of the optical disk place as an object of recording or playback being performed by the optical disk device is within a predetermined range.

4. An optical disk device according to claim 1, wherein the amount of phase lead to be imparted by the phase lead imparting module is adjusted with a time resolution shorter than half of a zero-order hold period in the storing module.

5. An optical disk device according to any claim 1, wherein the rotation period information acquiring module acquires address information of the optical disk being irradiated with the laser beam, from a rotation synchronous signal output of the optical detector module thereby to calculate rotation period information.

6. An optical disk device according to claim 1, wherein the rotation period information acquiring module calculates rotation period information from an output of the disk rotating module.

7. An optical disk device according to claim 1, wherein
the servo error signal is a radial tracking error signal, and
the output signal of the phase lead imparting module is summed to a radial tracking servo loop.

8. An optical disk device according to claim 1, wherein
the servo error signal is an axial tracking error signal; and
the output signal of the phase lead imparting module is summed to an axial tracking servo loop.

9. An optical disk device for performing recording or playback of information by irradiating a laser beam on an optical disk, the optical disk device comprising:
an optical detector module that outputs an electric signal corresponding to an amount of reflected light from the optical disk;
a servo error signal generating module that generates a servo error signal from an output signal of the optical detector module;
a control module that executes feedback control by generating a driving signal that drives a servo actuator in accordance with the servo error signal;
a disk rotating module that rotates the optical disk;
a rotation synchronous signal generating module that generates a signal synchronous with the rotation from an output of the disk rotating module;
a rotation period information acquiring module that acquires rotation period information of the optical disk;
a summing module that sums a compensation signal to a predetermined signal in a servo loop, the compensation signal being used to compensate for a periodical disturbance input into a servo system of the optical disk device in units of a rotation angle of the disk rotating module;
a storing module that stores an output signal of the summing module in a zero-order hold manner, synchronously with the output signal of the rotation synchronous signal generating module;
a phase lead imparting module that imparts a predetermined amount of phase lead to the output signal of the storing module and that outputs the predetermined amount of phase lead as the compensation signal; and
a low pass filter at least on any one of an input side and an output side of the storing module, wherein
the predetermined amount of phase lead is determined in accordance with the rotation period information.

10. An optical disk device according to claim 9, wherein the phase lead imparting module imparts an amount of phase lead corresponding to the sum of a delay time due to the low pass filter and a delay time due to a zero-order hold property in the storing module.

11. An optical disk device according to claim 9, wherein the low pass filter has a linear phase property at least in a pass band.

12. An optical disk device according to claim 9, wherein the phase lead imparting module imparts an identical amount of phase lead within a period during which a radial position of the optical disk place as an object of recording or playback being performed by the optical disk device is within a predetermined range.

13. An optical disk device according to claim 9, wherein the amount of phase lead to be imparted by the phase lead imparting module is adjusted with a time resolution shorter than half of a zero-order hold period in the storing module.

14. An optical disk device according to claim 9, wherein the rotation period information acquiring module acquires address information of the optical disk being irradiated with the laser beam, from a rotation synchronous signal output of the optical detector module thereby to calculate rotation period information.

15. An optical disk device according to claim 9, wherein the rotation period information acquiring module calculates rotation period information from an output of the disk rotating module.

16. An optical disk device according to claim 9, wherein
the servo error signal is a radial tracking error signal, and
the output signal of the phase lead imparting module is summed to a radial tracking servo loop.

17. An optical disk device according to claim 9, wherein
the servo error signal is an axial tracking error signal; and
the output signal of the phase lead imparting module is summed to an axial tracking servo loop.

18. An optical disk device for recording information onto an optical disk or playback or playing back information from the optical disk, the optical disk device comprising:
a detector that detects reflected light from the optical disk;
a servo error signal generating circuit that generates a servo error signal in accordance with an output of the detector;
a control module that controls a servo actuator in accordance with the servo error signal;
a summing circuit that sums a compensation signal corresponding to a periodical disturbance of the optical disk to a predetermined signal in a servo loop;
a memory that stores an output signal of the summing circuit; and
an adjusting circuit that adjusts a timing of summing the compensation signal in the summing circuit in correspondence to a delay time in the memory.

* * * * *